(12) United States Patent
Zhang et al.

(10) Patent No.: US 11,118,687 B2
(45) Date of Patent: Sep. 14, 2021

(54) PLUG SYSTEM

(71) Applicants: Zhihui Zhang, Katy, TX (US);
YingQing Xu, Tomball, TX (US);
Zhiyue Xu, Cypress, TX (US)

(72) Inventors: Zhihui Zhang, Katy, TX (US);
YingQing Xu, Tomball, TX (US);
Zhiyue Xu, Cypress, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 119 days.

(21) Appl. No.: 16/378,078

(22) Filed: Apr. 8, 2019

(65) Prior Publication Data
US 2020/0318741 A1 Oct. 8, 2020

(51) Int. Cl.
*F16K 1/18* (2006.01)
*E21B 41/00* (2006.01)
*E21B 23/10* (2006.01)

(52) U.S. Cl.
CPC .............. *F16K 1/18* (2013.01); *E21B 23/10* (2013.01); *E21B 41/005* (2013.01)

(58) Field of Classification Search
CPC ... F16K 1/14; F16K 1/16; E21B 34/08; E21B 2200/046; E21B 23/10
USPC .............................................. 137/539, 513.7
See application file for complete search history.

(56) References Cited

U.S. PATENT DOCUMENTS

| 7,287,596 | B2 * | 10/2007 | Frazier .................... E21B 43/14 166/332.8 |
| 8,397,823 | B2 * | 3/2013 | Xu .......................... E21B 23/04 166/373 |
| 2011/0030976 | A1 | 2/2011 | King |
| 2014/0041876 | A1 | 2/2014 | Fleckenstein et al. |
| 2014/0076560 | A1 | 3/2014 | Kenyon et al. |
| 2016/0130910 | A1 | 5/2016 | Gonzalez et al. |
| 2016/0341002 | A1 | 11/2016 | McKitrick, III |

* cited by examiner

*Primary Examiner* — P. Macade Nichols
(74) *Attorney, Agent, or Firm* — Cantor Colburn LLP

(57) ABSTRACT

A plug system including a housing, a member movably disposed in the housing, a seat disposed at the member, the seat receptive to an object, and a flapper connected to the member and closable onto the member when the member is shifted by the object.

14 Claims, 4 Drawing Sheets

PLUG SYSTEM

BACKGROUND

In the drilling and completion industry, it is often desirable to use plug systems including objects to block flow passages such as an inside diameter of a borehole tubing member (e.g. tubing string). Objects include balls, darts, etc. and are generally landed on seats installed in the tubing member for the purpose of interacting with the objects at a selected time and for the purpose of allowing an operator to generate a differential pressure across the object and seat. One operation utilizing the above is a fracing operation. Fracing operations generally require a significant differential pressure across the object and seat and hence such operations also tend to produce the undesirable side effect of causing the object to become stuck in the seat. Object stuck in the seat are undesirable since they inhibit of prevent production flow from downhole of the stuck object/seat combination.

The art would be receptive to plug systems facilitating fluid flow after a fracing or other high pressure differential operation.

SUMMARY

A plug system including a housing, a member movably disposed in the housing, a seat disposed at the member, the seat receptive to an object, and a flapper connected to the member and closable onto the member when the member is shifted by the object.

A plug system including a housing, a member movably disposed in the housing, a seat disposed at the member, the seat receptive to an object, and a fluid bypass configuration allowing fluid to flow past the seat with an object seated thereon in a direction opposite a direction from which the object came to the seat.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
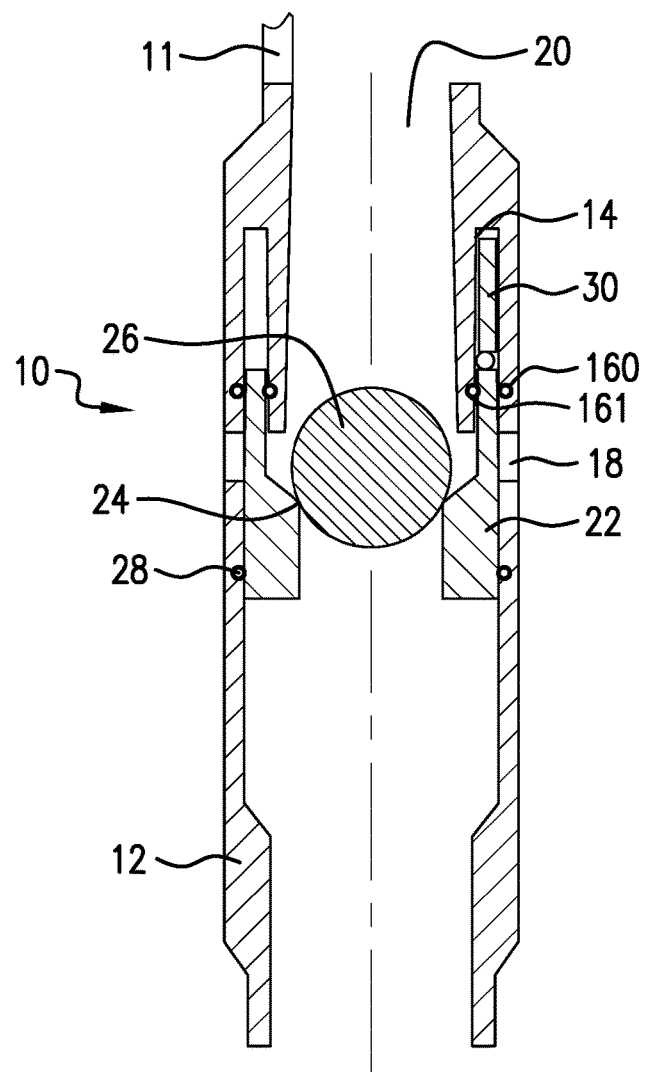
FIG. 1 illustrates a first embodiment of a plug system in a first condition.
Figure 2:
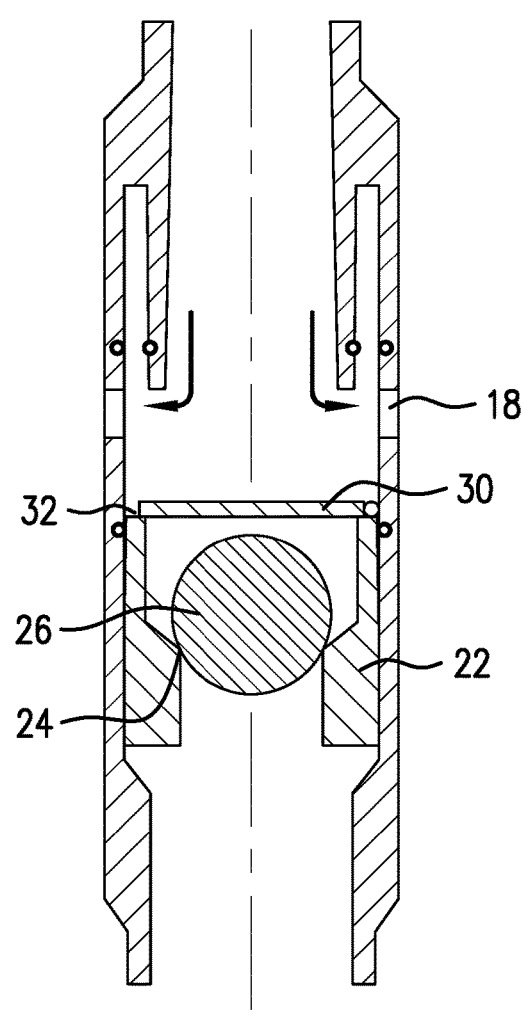
FIG. 2 illustrates the first embodiment plug system in a second condition.

Referring to FIG. 1, a plug system 10 is illustrated in a first condition. The system 10 includes a housing 12 that may be a section of tubing that is a part of a tubing string in some embodiments. Housing 12 includes a flapper recess 14 having a pair of seals 16o and 16i to ensure that when a flapper is positioned therein, it is segregated from borehole fluids. In embodiments, the housing 12 includes ports 18 that are initially fluidly segregated from a central flow area 20 of the housing 12. Movably disposed within the housing 12 is a member 22 having a seat 24 receptive to an object 26. When in the first condition (illustrated in FIG. 1), the member 22 physically blocks the ports 18 in the housing 12 and is sealed to the housing 12 by seals 28 and 16i. As will be appreciated by one of ordinary skill in the art, the object 26 may not initially be on its seat 24 but may be migrated to that location from a remote location at a selected time. Once on the seat 24 however, a differential pressure across the object 26 and member 22 may be created thereby causing the object 26 and member 22 to move toward the lower pressure side, which in the illustration is toward the bottom of the figure. The second condition is illustrated in FIG. 2. It is apparent that ports 18 are open in the second condition. Also notable in FIG. 2 is that a flapper 30 articulably attached to the member 22, formerly disposed within recess 14 is in the second condition free of the recess 14 and closed across a flapper seat 32 of member 22. Pressure and or gravity are used to ensure closure of the flapper 30 on its seat 32. In this condition, a significant application of pressure against the seated flapper 30 will result in a fracturing of the formation outside of the housing 12. Advantageously, since the flapper 30 is the component seeing the pressure, the object 26 is not forced into the seat 24 in such a way as to become stuck therein. More specifically, the object 26 is used in this embodiment merely to shift the member 22 to the second condition and plays no part in the pressured portion of the operation. Accordingly, upon completion of the pressured portion of the operation, flowing of fluid from downhole of the plug system 10 will easily unseat the object 26 and push the flapper 30 open. Fluid flow may continue in this manner or may additionally flow the object back to surface, dissolve the object with passing fluid, push the flapper out of the way or dissolve the flapper with flowing fluid or combinations of the foregoing.

Figure 7:
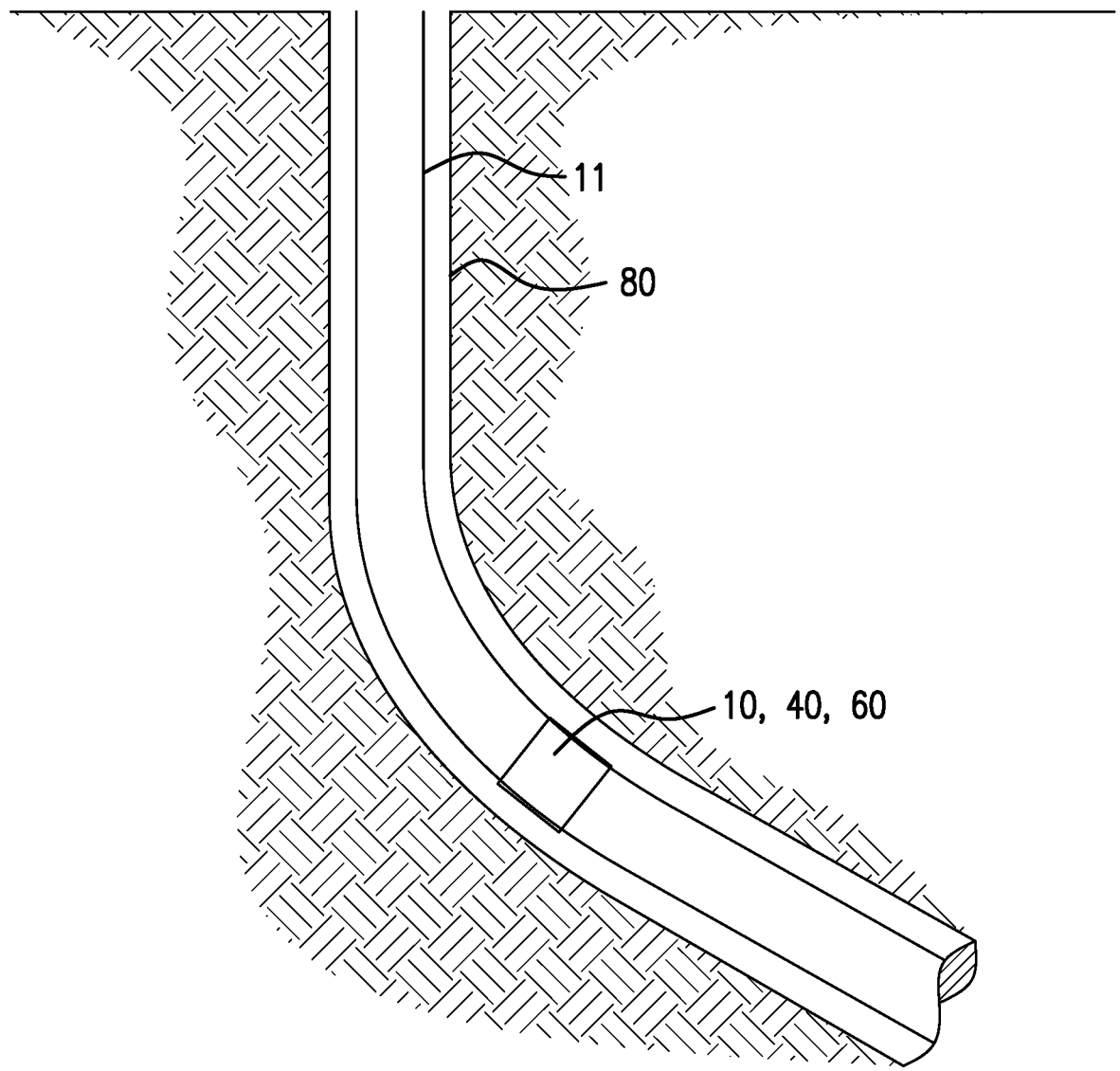
FIG. 7 illustrates a borehole system including any of the plug systems disclosed herein.

In operation of the first embodiment (FIG. 7 is generic to all disclosed systems), the plug system 10 is disposed in a borehole 80. In some iterations the system 10 is disposed within or as a part of a tubing string 11 within the borehole 80. At an appropriate time an operator may drop an object 26 on the seat 24 of the system 10. Thereafter a first pressure differential across the seat 24 and object 26 will be applied simply to shift the member 22 to a position that uncovers the ports 18. Later, including immediately thereafter, higher pressure is applied to undertake a particular pressured operation. Fracturing is one example. High pressures such as for fracturing or other operations including the use of high differential pressures are segregated form the object 26 by the flapper 30 that has been closed pursuant to the shifting of the member 22. Therefore the pressure operation will not cause the object 26 to become stuck in the seat 24. Since the object 26 is not stuck in the seat 24, fluid flowing in a direction opposite that in which the object 26 came to the system 10 will cause the object 26 to flow back off the seat 24 and will cause the flapper 30 to open.

Figure 3:
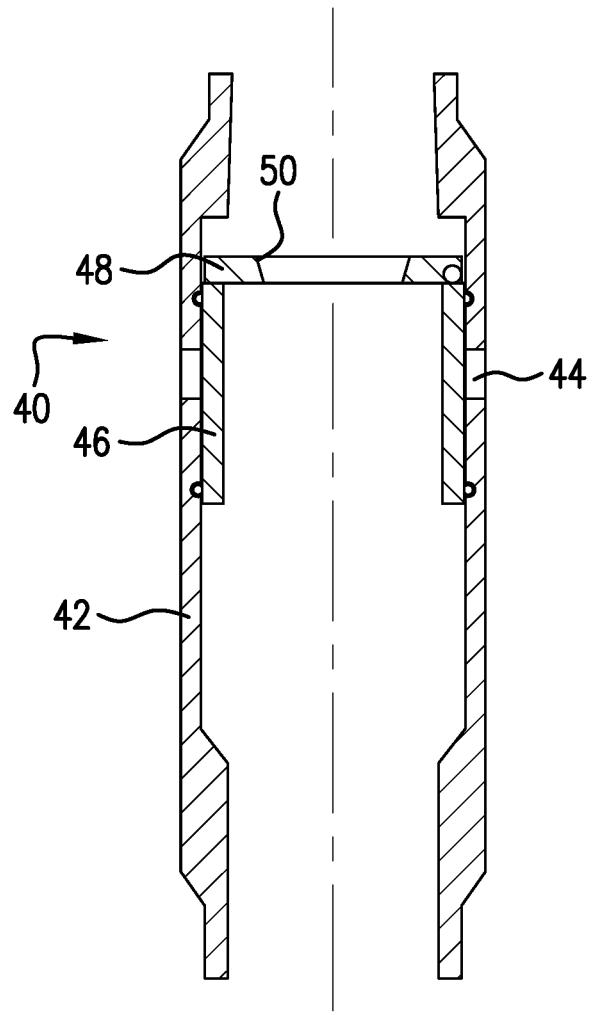
FIG. 3 illustrates a second embodiment of a plug system in a first condition.
Figure 4:
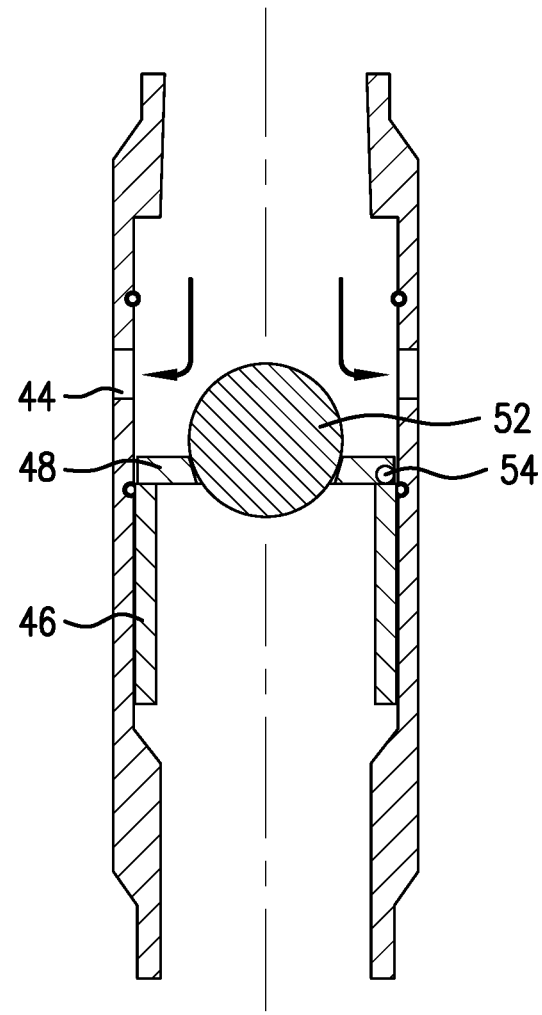
FIG. 4 illustrates the second embodiment plug system in a second condition.

In another embodiment, referring to FIG. 3, a plug system 40 is illustrated that includes a housing 42 having ports 44 and a member 46 with a fluid bypass configuration, which in this embodiment is a flapper 48 articulably attached to the member 46. The flapper in this embodiment includes an object seat 50. Upon an object 52 (see FIG. 4) seated in the object seat 50, a differential pressure can be built across the member/object/flapper thereby urging the member/object/flapper downhole. In an embodiment, this action opens the ports 44 allowing pressurized fluid to fracture the formation outwardly of the housing 42. After the pressured operation, the object 52 may indeed be stuck in the seat 50 but because the flapper 48 may move on its articulated joint 54, flow from downhole of the member 46 will still unseat the flapper 48 thereby allowing fluid to flow in the uphole direction. It will be appreciated that the degree of opening of the flapper 48 depends upon when in the particular arrangement, the object will contact an inside surface of the housing 42. In the illustrated embodiment in FIG. 4, it is estimated the flapper will move to a position of about 45 degree angle before the object 52 rests against the inside surface of housing 42. In this position, downhole fluids flowing past the object 52 and flapper 48 are either sufficient for the intent of the operator or one or both of the object 52 and flapper 48 may be constructed of a degradable material such that they will go away in a relatively short period of time such as hours or days.

Figure 5:
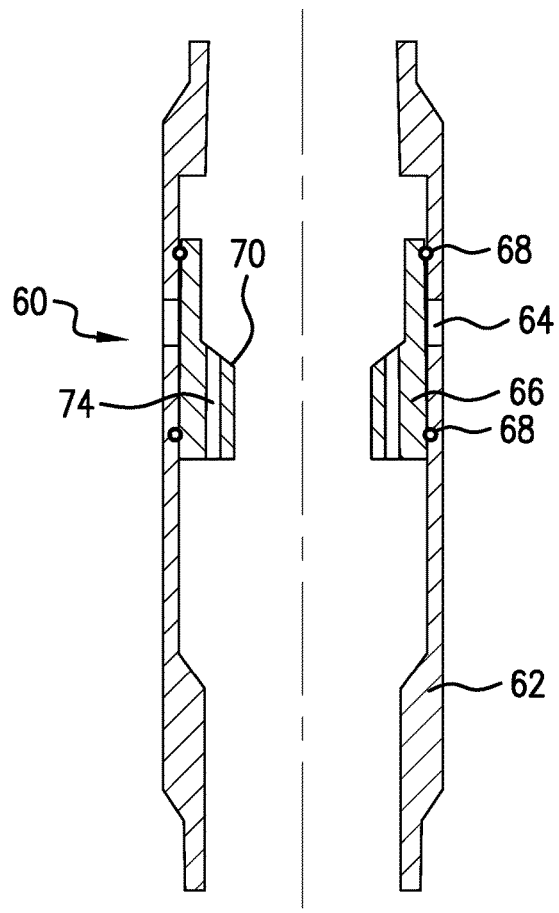
FIG. 5 illustrates a third embodiment of a plug system in a first condition.
Figure 6:
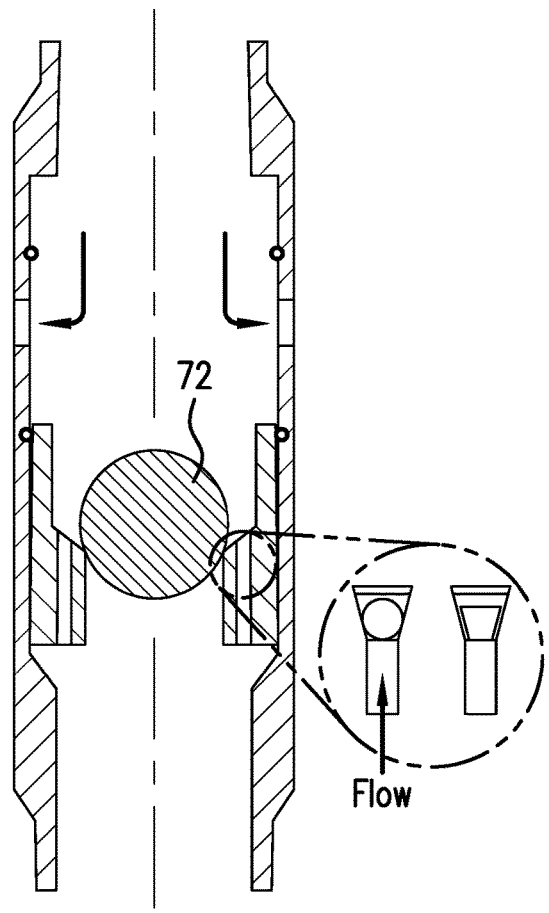
FIG. 6 illustrates the third embodiment plug system in a second condition.

In yet another embodiment, referring to FIG. 5, a plug system 60 is illustrated. The system 60 includes a housing 62 having ports 64. The system 60 further includes a member 66 that is initially positioned to occlude the ports 64 and is sealed to housing 62 by seals 68. Member 66 includes a seat 70 receptive to an object 72 (shown in FIG. 2). Member 66 further includes a fluid bypass configuration, which in this embodiment is one or more one-way flow arrangements 74 allowing fluid to flow around the object 72 if indeed the object 72 becomes stuck in the seat 70 during a pressured operation. In embodiments the arrangement 74 may be a check valve. It will be appreciated that the arrangements are selected to allow easy passage in the direction from downhole to uphole but will hold firm in the check direction (uphole to downhole) so that significant pressure differential may be built across the object 72 and member 66. With the arrangements allowing flow of fluid from downhole of the system 60, the object remains in a flowing fluid rather than a stagnant fluid and hence degradation continues in the hours or days it was originally designed to take.

In operation of the second and third embodiments (FIG. 7 is generic to all disclosed systems), the plug system 40, 60 is disposed in a borehole 80. In some iterations the system 40, 60 is disposed within or as a part of a tubing string 11 within the borehole 80. At an appropriate time an operator may drop an object 52, 72 on the seat 50, 70 of the system 40, 60. Thereafter a first pressure differential across the seat 50, 70 and object 52, 72 will be applied simply to shift the member 46, 66 to a position that uncovers the ports 44, 64. Later, including immediately thereafter or as a part of the original pressuring, higher pressure is applied to undertake a particular pressured operation. Fracturing is one example. High pressures such as for fracturing or other operations including the use of high differential pressures cause the object 52, 72 to become stuck in the respective seats 50, 70. Fluid flowing in a direction opposite that in which the object 52, 72 came to the system 40, 60 cannot dislodge the object 52, 72 from the seat 50, 70. However, the fluid bypass configuration facilitates fluid flow past the obstruction of the object 52, 72 on the respective seat 50, 70. Flowing fluid will aid in degradation of degradable components of the system 40, 60 such as objects, flapper, seats, etc.

It is to be understood that while schematic examples of a fracturing operation are used herein, the plug system embodiments are usable in many other types of pressure differential using operations as well. If an operation does not risk an object being stuck in its seat then the benefits of the systems hereof may not be needed but the systems hereof are still employable for those operations. Advantageously, if an object were to become stuck in an operation whether or not it was anticipated, the systems described herein will alleviate the problem.

Set forth below are some embodiments of the foregoing disclosure:

Embodiment 1: A plug system including a housing, a member movably disposed in the housing, a seat disposed at the member, the seat receptive to an object, and a flapper connected to the member and closable onto the member when the member is shifted by the object.

Embodiment 2: The plug system as in any prior embodiment wherein the flapper is a degradable material.

Embodiment 3: The plug system as in any prior embodiment wherein the housing further includes a recess receptive to the flapper in a first condition to segregate the flapper from an environment outside of the recess.

Embodiment 4: The plug system as in any prior embodiment wherein the recess includes seals interactive with the member to seal the recess.

Embodiment 5: The plug system as in any prior embodiment wherein the housing includes a port that in a first condition of the system is closed by the member and in a second condition of the system is open.

Embodiment 6: A method for effecting a pressure operation in a borehole and facilitating flow after the pressure operation including disposing the plug system as in any prior embodiment in a borehole, dropping an object on the seat of the system, shifting the member with differential pressure across the object and seat, the pressure being lower than that required to cause the object to become stuck in the seat, closing the flapper thereby isolating the object from higher applied pressures, pressuring for an operation, and flowing fluid to dislodge the object and open the flapper.

Embodiment 7: The method as in any prior embodiment further comprising degrading the flapper.

Embodiment 8: A plug system including a housing, a member movably disposed in the housing, a seat disposed at the member, the seat receptive to an object, and a fluid bypass configuration allowing fluid to flow past the seat with an object seated thereon in a direction opposite a direction from which the object came to the seat.

Embodiment 9: The plug system as in any prior embodiment wherein the fluid bypass configuration includes a flapper connected to the member and having a seat receptive to the object.

Embodiment 10: The plug system as in any prior embodiment wherein the flapper is degradable.

Embodiment 11: The plug system as in any prior embodiment wherein the fluid bypass configuration is a one-way flow arrangement.

Embodiment 12: The plug system as in any prior embodiment wherein the one-way flow arrangement is a check valve.

Embodiment 13: The plug system as in any prior embodiment wherein the one-way flow arrangement is a plurality of check valves disposed about the member.

Embodiment 14: A method for effecting a pressure operation in a borehole and facilitating flow after the pressure operation including disposing the plug system as in any prior embodiment in a borehole, dropping an object on the seat of the system, shifting the member with differential pressure across the object and seat, that causes the object to become stuck in the seat, and flowing fluid past the object in a direction opposite to that from which the object came to the system.

Embodiment 15: The method as in any prior embodiment wherein the seat is in a flapper and wherein the flowing is facilitated by opening the flapper while the stuck object remains in the seat.

Embodiment 16: The method as in any prior embodiment wherein the member includes a one way flow arrangement and the flowing is through the one-way flow arrangement.

Embodiment 17: A borehole system including a borehole in a formation, a plug system as in any prior embodiment disposed in the borehole.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A plug system comprising:
a housing;
a member movably disposed in the housing;
a seat disposed at the member, the seat receptive to an object; and
a flapper connected to the member and closable onto the member when the member is shifted by the object, wherein the housing further includes a recess receptive to the flapper in a first condition to segregate the flapper from an environment outside of the recess.

2. The plug system as claimed in claim 1 wherein the flapper is a degradable material.

3. The plug system as claimed in claim 1 wherein the recess includes seals interactive with the member to seal the recess.

4. The plug system as claimed in claim 1 wherein the housing includes a port that in a first condition of the system is closed by the member and in a second condition of the system is open.

5. A method for effecting a pressure operation in a borehole and facilitating flow after the pressure operation comprising:
disposing the plug system as claimed in claim 1 in a borehole;
dropping an object on the seat of the system;
shifting the member with differential pressure across the object and seat, the pressure being lower than that required to cause the object to become stuck in the seat;
closing the flapper thereby isolating the object from higher applied pressures;
pressuring for an operation; and
flowing fluid to dislodge the object and open the flapper.

6. The method as claimed in claim 5 further comprising degrading the flapper.

7. A plug system comprising:
a housing;
a member movably disposed in the housing;
a seat disposed at the member, the seat receptive to an object; and
a fluid bypass configuration comprising a plurality of flow arrangements disposed through the member and located radially of the seat allowing fluid to flow past the seat with an object seated thereon in a direction opposite a direction from which the object came to the seat.

8. The plug system as claimed in claim 7 wherein the fluid bypass configuration includes a flapper connected to the member and having a seat receptive to the object.

9. The plug system as claimed in claim 8 wherein the flapper is degradable.

10. The plug system as claimed in claim 7 wherein the plurality of flow arrangements are a one-way flow.

11. The plug system as claimed in claim 10 wherein the plurality of flow arrangements are check valves.

12. A method for effecting a pressure operation in a borehole and facilitating flow after the pressure operation comprising:
disposing the plug system as claimed in claim 7 in a borehole;
dropping an object on the seat of the system;
shifting the member with differential pressure across the object and seat, that causes the object to become stuck in the seat; and
flowing fluid past the object in a direction opposite to that from which the object came to the system.

13. The method as claimed in claim 12 wherein the seat is in a flapper and wherein the flowing is facilitated by opening the flapper while the stuck object remains in the seat.

14. A borehole in a formation;
a plug system as claimed in claim 7 disposed in the borehole.

* * * * *